(12) United States Patent
Palanisamy et al.

(10) Patent No.: US 11,016,495 B2
(45) Date of Patent: May 25, 2021

(54) METHOD AND SYSTEM FOR END-TO-END LEARNING OF CONTROL COMMANDS FOR AUTONOMOUS VEHICLE

(71) Applicants: GM GLOBAL TECHNOLOGY OPERATIONS LLC, Detroit, MI (US); Carnegie Mellon University, Pittsburgh, PA (US)

(72) Inventors: Praveen Palanisamy, Sterling Heights, MI (US); Upali P. Mudalige, Oakland Township, MI (US); Yilun Chen, Pittsburgh, PA (US); John M. Dolan, Pittsburgh, PA (US); Katharina Muelling, Pittsburgh, PA (US)

(73) Assignees: GM GLOBAL TECHNOLOGY OPERATIONS LLC, Detroit, MI (US); CARNEGIE MELLON UNIVERSITY, Pittsburgh, PA (US)

( * ) Notice: Subject to any disclaimer, the term of this patent is extended or adjusted under 35 U.S.C. 154(b) by 239 days.

(21) Appl. No.: 16/180,849

(22) Filed: Nov. 5, 2018

(65) Prior Publication Data
US 2020/0142421 A1    May 7, 2020

(51) Int. Cl.
*G05D 1/02* (2020.01)
*G05D 1/00* (2006.01)
*G06N 5/04* (2006.01)
*G06K 9/48* (2006.01)
*G06N 3/08* (2006.01)

(52) U.S. Cl.
CPC ......... *G05D 1/0221* (2013.01); *G05D 1/0088* (2013.01); *G05D 1/0246* (2013.01); *G06K 9/481* (2013.01); *G06N 3/08* (2013.01); *G06N 5/046* (2013.01); *G05D 2201/0213* (2013.01)

(58) Field of Classification Search
CPC .. G05D 1/0221; G05D 1/0088; G05D 1/0246; G05D 2201/0213; G06N 5/046; G06N 3/08; G06N 3/0481; G06N 3/0445; G06N 3/084; G06N 3/0454; G06K 9/481
USPC .......................................... 701/23
See application file for complete search history.

(56) References Cited

PUBLICATIONS

Arulkumaran, Kai et al. A Brief Survey of Deep Reinforcement Learning. IEEE Signal Magazine. Sep. 28, 2017.
(Continued)

*Primary Examiner* — Maceeh Anwari
(74) *Attorney, Agent, or Firm* — Lorenz & Kopf, LLP

(57) ABSTRACT

Systems and methods are provided for end-to-end learning of commands for controlling an autonomous vehicle. A pre-processor pre-processes image data acquired by sensors at a current time step (CTS) to generate pre-processed image data that is concatenated with additional input(s) (e.g., a segmentation map and/or optical flow map) to generate a dynamic scene output. A convolutional neural network (CNN) processes the dynamic scene output to generate a feature map that includes extracted spatial features that are concatenated with vehicle kinematics to generate a spatial context feature vector. An LSTM network processes, during the (CTS), the spatial context feature vector at the (CTS) and one or more previous LSTM outputs at corresponding previous time steps to generate an encoded temporal context vector at the (CTS). The fully connected layer processes the encoded temporal context vector to learn control command (s) (e.g., steering angle, acceleration rate and/or a brake rate control commands).

18 Claims, 7 Drawing Sheets

(56) References Cited

PUBLICATIONS

Szepesvari, Csaba. Algorithms for Reinforcement Learning. Draft of the lecture published in the Synthesis Lectures on Artificial Intelligence & Machine Learning series by Morgon & Claypool Publishers. Jun. 9, 2009.

Lillicrap, Timothy P.; Hunt, Johnathan J.; Pritzel, Alexander; Heess, Nicolas; Erez, Tom; Tassa, Yuval; Silver, David and Wierstra, Daan. Continuous control with deep reinforcement learning. arXiv preprint arXiv:1509.02971, 2015. (Submitted on Sep. 9, 2015 (v1), last revised Feb. 29, 2016 (v5)).

Kulkarni, Tejas D.; Narasimhan, Karthik; Saeedi, Ardavan and Tenen-baum, Josh . Hierarchical deep reinforcement learning: Integrating temporal abstraction and intrinsic motivation. In Advances in neural information processing systems, pp. 3675-3683, 2016.

Luong, Minh-Thang; Pham, Hieu and Manning, Christopher D. Effective approaches to attention-based neural machine translation. arXiv preprint arXiv:1508.04025, 2015.

Seleznev, Ivan Alexey; Pavlov, Mikhail; Fedorov, Aleksandr and Ignateva, Anastasiia . Deep attention recurrent q-network. arXiv preprint arXiv:1512.01693, 2015.

Yang, Zhaoyang; Merrick, Kathryn; Jin, Lianwen and Abbass, Hussein A . Hierarchical deep reinforcement learning for continuous action control. IEEE Transactions on Neural Networks and Learning Systems, 2018.

Bojarski, M.; Del Testa, D.; Dworakowski, D.; Firner, B.; Flepp, B.; Goyal, P.; Jackel, L. D.; Monfort, M.; Muller, U.; Zhang, J. et al. End to end learning for self-driving cars. arXiv preprint arXiv:1604.07316, 2016.

Chen, Z and Huang, X. End-to-end learning for lane keeping of self-driving cars. In Intelligent Vehicles Symposium (IV), 2017 IEEE, pp. 1856-1860. IEEE, 2017.

Muller, U.; Ben, J.; Cosatto, E.; Flepp, B and Cun, Y. L. Off-road obstacle avoidance through end-to-end learning. In Ad-vances in neural information processing systems, pp. 739-746, 2006.

Rausch, V.; Hansen, A.; Solowjow, E.; Liu, C.; Kreuzer, E. and Hedrick, J. K. Learning a deep neural net policy for end-to-end control of autonomous vehicles. In American Control Conference (ACC), 2017, pp. 4914-4919. IEEE, 2017.

Github, Colah. Understanding LSTM Networks. Aug. 27, 2015. http://colah.github.io/posts/2015-08-Understanding-LSTMs/.

METHOD AND SYSTEM FOR END-TO-END LEARNING OF CONTROL COMMANDS FOR AUTONOMOUS VEHICLE

INTRODUCTION

The present disclosure generally relates to autonomous vehicles, and more particularly relates to autonomous vehicle controllers, autonomous vehicle control system systems and associated methods for controlling autonomous vehicles. More particularly, the present disclosure relates to methods and systems for end-to-end learning of control commands used to control an autonomous vehicle.

An autonomous vehicle is a vehicle that is capable of sensing its environment and navigating with little or no user input. An autonomous vehicle includes an autonomous driving system (ADS) that intelligently controls the autonomous vehicle. A sensor system senses its environment using sensing devices such as radar, lidar, image sensors, and the like. The ADS can also process information from global positioning systems (GPS) technologies, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels. Currently, there are many different approaches for autonomous vehicle control, but all suffer from drawbacks.

On-road navigation systems are a crucial component for achieving fully autonomous vehicles. While perception and control have long been two challenges that have been researched separately in the autonomous driving industry, recent advances in deep learning have introduced end-to-end learning as a new method for learning driving policies for self-driving vehicles. Unlike traditional approaches that divide the vehicle control system into separate perception and control modules, end-to-end learning systems often directly learn using a single deep convolutional neural network to map from perception (e.g., raw pixels from images acquired by onboard cameras) to control (e.g., control commands that control actuators that control the vehicle). For instance, in one approach, an end-to-end system has been proposed that uses one convolutional neural network to directly learn steering control commands from raw pixels. These end-to-end learning systems have the advantage of direct optimization without manually defined rules, which can result in better performance and less human engineering efforts.

While such end-to-end learning systems simplify modeling, they have a number of drawbacks. One drawback is that such end-to-end learning systems do not further consider other factors, which has prevented such end-to-end learning systems from learning more complex driving behaviors. For example, such end-to-end learning systems lose a lot of detailed dynamic information for a specific driving task. Factors like speed, map information and vehicle mechanics are all important parts of driving task. Another drawback is that such end-to-end learning systems do not take advantage of prior knowledge. For instance, people obey a lot of basic assumptions like traffic rules when driving, whereas the neural network in current end-to-end learning systems is expected to learn from scratch. In addition, such end-to-end learning systems only consider current perception information for decision making. By contrast, when people drive they rely on past information they have learned use it along with their current perception information to make decisions.

Accordingly, it is desirable to provide learning systems and methods that are capable of learning control commands for controlling an autonomous vehicle. Moreover, it is desirable to provide learning systems and methods that take advantage of prior knowledge, that take advantage of past information that the learning system has learned, and that are capable of learning more complex driving behaviors, while also being reliable, easy to train, and easy to validate. Furthermore, other desirable features and characteristics of the present disclosure will become apparent from the subsequent detailed description and the appended claims, taken in conjunction with the accompanying drawings and the foregoing technical field and background.

The background description provided herein is for the purpose of generally presenting the context of the disclosure. Work of the presently named inventors, to the extent it is described in this background section, as well as aspects of the description that may not otherwise qualify as prior art at the time of filing, such as drawbacks or prior approaches, are neither expressly nor impliedly admitted as prior art against the present disclosure.

SUMMARY

In one embodiment, an end-to-end learning method is provided for end-to-end learning of commands for controlling an autonomous vehicle. A pre-processor pre-processes image data acquired by sensors from an environment at a current time step (T) to generate pre-processed image data. In one embodiment, the pre-processor includes a cropping module that crops the image data to remove extraneous elements and generate cropped image data, an upsampling module that upsamples the cropped image data to generate upsampled image data, a brightness change module that applies a brightness change to brighten the upsampled image data to generate brightened-upsampled image data, and a flipping module that flips the brightened-upsampled image data to obtain a mirror image in a horizontal direction to generate the pre-processed image data.

The pre-processed image data is concatenated with at least one additional input to generate a dynamic scene output that is a concatenation of the pre-processed image data and the at least one additional input. For example, in one embodiment, the pre-processed image data is processed at a segmentation neural network to generate a segmentation map in which each pixel of the pre-processed image data has been assigned a label, and the pre-processed image data is concatenated with the segmentation map to generate the dynamic scene output, which is an augmented segmentation map. In another embodiment, the pre-processed image data is processed at an optical flow neural network to generate an optical flow map that estimates optical flow, and the pre-processed image data is concatenated with the optical flow map to generate the dynamic scene output. In another embodiment, the pre-processed image data is processed at a segmentation neural network to generate a segmentation map in which each pixel of the pre-processed image data has been assigned a label, and is also processed at an optical flow neural network to generate an optical flow map that estimates optical flow. The pre-processed image data is concatenated with the segmentation map and the optical flow map to generate the dynamic scene output, which is an augmented segmentation map.

Regardless of the implementation, a convolutional neural network (CNN) processes the dynamic scene output to generate a feature map comprising extracted spatial features. In one embodiment, the CNN is a pre-trained CNN that has been pre-trained using an image data set from an image database. For example, the initial weights of the pre-trained CNN are set prior to the step of processing the augmented segmentation map to generate the feature map and then fine-tuned during training.

Vehicle kinematics are then concatenated with the extracted spatial features from the feature map to generate a spatial context feature vector comprising context features that describe a current context at the current time step (T). The vehicle kinematics can include one or more of: vehicle acceleration rate, vehicle speed, vehicle heading, vehicle lateral distance to road boundary, vehicle previous steering angle, and vehicle steering torque.

A Long Short-Term Memory (LSTM) network comprising a network of LSTM cells can then process, during the current time step (T), the spatial context feature vector at the current time step (T) and one or more previous LSTM outputs at one or more corresponding previous time steps to generate an encoded temporal context vector at the current time step (T). In one embodiment, each of the one or more previous LSTM outputs is a context feature vector from a particular previous time step. In one embodiment, the number of one or more previous LSTM outputs is specified by a window size (w) that defines the number of the one or more previous LSTM outputs to be processed by the LSTM network along with the spatial context feature vector to generate the encoded temporal context vector at the current time step (T).

A fully connected layer can then process the encoded temporal context vector to learn one or more control commands. Each control command comprises at least one of: a steering angle control command, an acceleration rate control command, or a brake rate control command.

In one embodiment, an end-to-end learning system that implements the end-to-end learning is deployed within the autonomous vehicle that is controlled by a controller. The controller can execute one of the control commands generated by the end-to-end learning system, at each time step, based on a current observed environment An end-to-end learning system is provided for end-to-end learning of commands for controlling an autonomous vehicle. The system can include a pre-processor, a first concatenation unit, a convolutional neural network (CNN), a second concatenation unit, a Long Short-Term Memory (LSTM) network, and a fully connected layer.

The pre-processor pre-processes image data acquired by sensors from an environment at a current time step (T) to generate pre-processed image data. For example, in one embodiment, the pre-processor includes a cropping module that crops image data to remove extraneous elements to generate cropped image data, an upsampling module that upsamples the cropped image data to generate upsampled image data; a brightness change module that applies a brightness change to brighten the upsampled image data to generate brightened-upsampled image data, and a flipping module that flips the brightened-upsampled image data to obtain a mirror image in a horizontal direction to generate the pre-processed image data.

The first concatenation unit concatenates the pre-processed image data with one or more additional input(s), to generate a dynamic scene output that is a concatenation of the pre-processed image data and the one or more additional input(s). For example, in one embodiment, the system also includes a segmentation neural network that segments the pre-processed image data to generate a segmentation map in which each pixel of the pre-processed image data has been assigned a label. In this embodiment, the first concatenation unit can concatenate the pre-processed image data with the segmentation map to generate the dynamic scene output, where the dynamic scene output is an augmented segmentation map. In another embodiment, the system also includes an optical flow neural network that processes the pre-processed image data to generate an optical flow map that estimates optical flow. In this embodiment, the first concatenation unit concatenates the pre-processed image data with the optical flow map to generate the dynamic scene output. In still another embodiment, the system also includes both the segmentation neural network and the optical flow neural network, and processing at the optical flow neural network takes place in parallel with the segmenting of the pre-processed image data at the segmentation neural network. In this embodiment, the first concatenation unit concatenates the pre-processed image data with the segmentation map and the optical flow map to generate the dynamic scene output, where the dynamic scene output is an even further augmented segmentation map.

The convolutional neural network (CNN) processes the dynamic scene output to generate a feature map that includes extracted spatial features. In one embodiment, the CNN can be pre-trained using an image data set from an image database. Initial weights of the pre-trained CNN are set prior to the step of processing the augmented segmentation map to generate the feature map and then fine-tuned during training.

The second concatenation unit concatenates vehicle kinematics with the extracted spatial features from the feature map to generate a spatial context feature vector. The spatial context feature vector includes context features that describe a current context at the current time step (T). The vehicle kinematics can include, for example, one or more of vehicle acceleration rate, vehicle speed, vehicle heading, vehicle lateral di stance to road boundary, vehicle previous steering angle, and vehicle steering torque.

The LSTM network includes a network of LSTM cells. The LSTM network processes, during the current time step (T), the spatial context feature vector at the current time step (T) and one or more previous LSTM outputs at one or more corresponding previous time steps to generate an encoded temporal context vector at the current time step (T). Each of the one or more previous LSTM outputs is a context feature vector from a particular previous time step. In one embodiment, the number of one or more previous LSTM outputs is specified by a window size (w) that defines the number of the one or more previous LSTM outputs to be processed by the LSTM network along with the spatial context feature vector to generate the encoded temporal context vector at the current time step (T).

The fully connected layer processes the encoded temporal context vector to learn one or more control commands. Each control command can include one or more of: a steering angle control command, an acceleration rate control command, or a brake rate control command.

In another embodiment, an autonomous vehicle is provided. The autonomous vehicle comprises an end-to-end learning system deployed within the autonomous vehicle that is configured to learn control commands that control the autonomous vehicle, a driving environment processor configured to acquire image data from a current observed environment, and a driver agent configured to control the autonomous vehicle at each time step based on the current observed environment by issuing instructions to execute one or more of the control commands. Each control command comprises at least one of: a steering angle control command, an acceleration rate control command, or a brake rate control command.

The end-to-end learning system includes a processor configured to execute instructions of a computer program for learning the commands, which, when executed by the processor are configurable to perform a method. The method includes: pre-processing, at a pre-processor, image data acquired by sensors from the environment at a current time step (T) to generate pre-processed image data; concatenating the pre-processed image data with at least one additional input to generate a dynamic scene output that is a concatenation of the pre-processed image data and the at least one additional input; processing, at a convolutional neural network (CNN), the dynamic scene output to generate a feature map comprising extracted spatial features; concatenating vehicle kinematics with the extracted spatial features from the feature map to generate a spatial context feature vector comprising context features that describe a current context at the current time step (T); processing, at a Long Short-Term Memory (LSTM) network comprising a network of LSTM cells during the current time step (T), the spatial context feature vector at the current time step (T) and one or more previous LSTM outputs at one or more corresponding previous time steps to generate an encoded temporal context vector at the current time step (T); and processing, at a fully connected layer, the encoded temporal context vector to learn the control commands.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
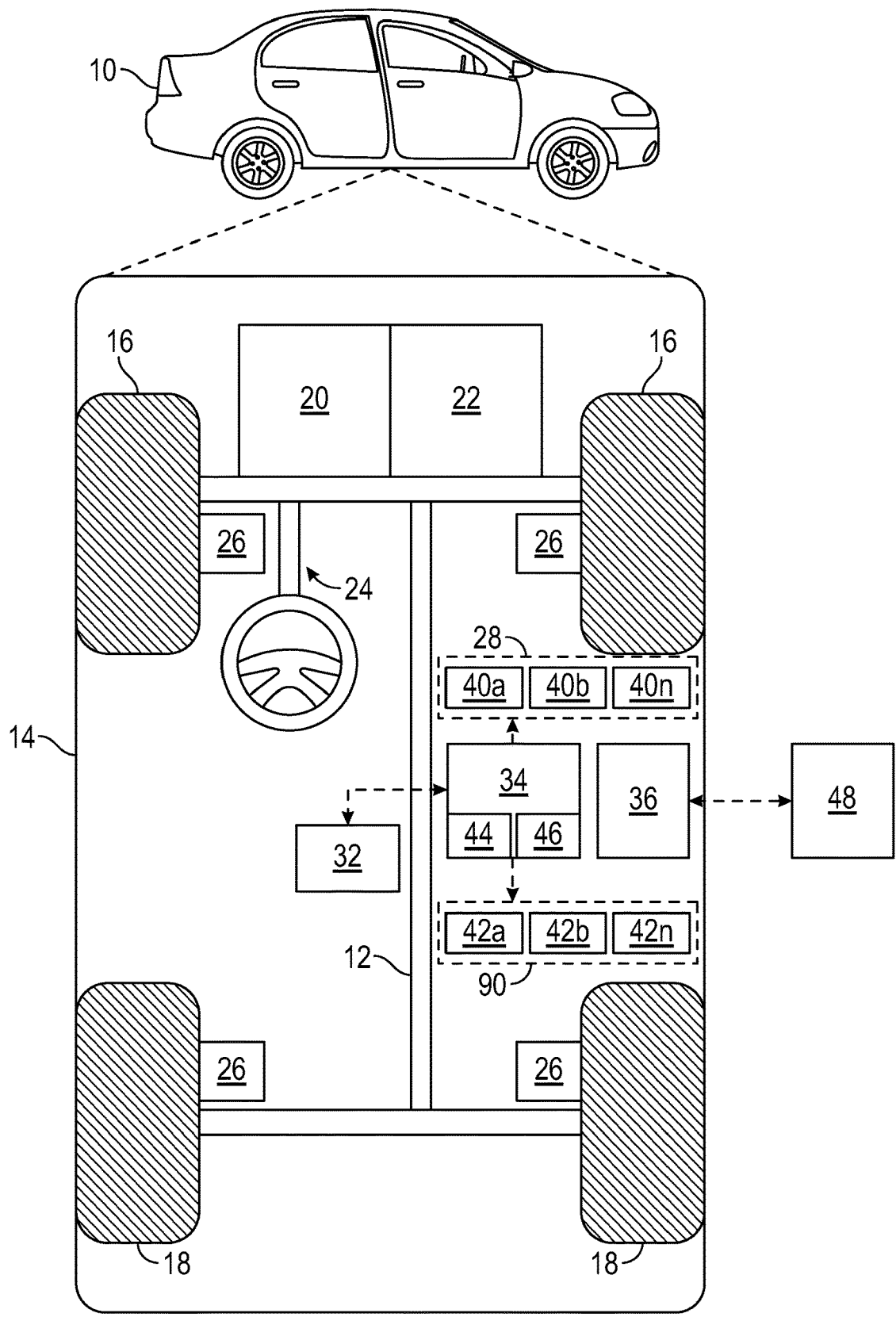
FIG. 1 is a functional block diagram illustrating an autonomous vehicle in accordance with the disclosed embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

A neural network is a machine learning model executed by a computing system or processing device. A neural network is made up of a number of simple, highly interconnected processing elements/devices/units, which can be implemented using software algorithms and/or actual hardware. The processing elements/devices/units process information by their dynamic state response to external inputs. A neural networks employs one or more layers of nonlinear units to predict an output for a received input. A neural network can be organized in layers that are made up of a number of interconnected nodes. Each node includes an activation function. A "deep neural network" is used to refer to a neural network with one or more hidden layers in addition to an output layer. The output of each hidden layer is used as input to the next layer in the network, i.e., the next hidden layer or the output layer. Each layer of the network generates an output from a received input in accordance with current values of a respective set of parameters. Patterns are presented to the network via an input layer, which communicates to one or more 'hidden layers' where the actual processing is done via a system of weighted connections. The hidden layers then link to an output layer where an output is generated. Most NNs contain some form of learning rule, which modifies the weights of the connections according to the input patterns that it is presented with. While each neural network is different, a neural network generally includes at least some of the following components: a set of processing units, the state of activation of a processing unit, the function used to compute output of a processing unit, the pattern of connectivity among processing units, the rule of activation propagation, the activation function, and the rule of learning employed. Design parameters for a neural network can include: the number of input nodes, the number of output nodes, the number of middle or hidden layers, the number of nodes per hidden layer, initial connection weights, the initial node biases, the learning rate, the momentum rate, etc.

FIG. 1 is a functional block diagram illustrating an autonomous vehicle in accordance with the disclosed embodiments. As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and an autonomous driving system (ADS) is incorporated into the autonomous vehicle 10 (hereinafter referred to as the autonomous vehicle 10) that intelligently controls the vehicle 10. The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 can be, for example, a Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, at least one data storage device 32, at least one controller 34, a communication system 36, and an actuator system 90. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, optical cameras, thermal cameras, imager sensors, ultrasonic sensors, inertial measurement units, global positioning systems, navigation systems, and/or other sensors.

For example, radar devices can process electromagnetic waves reflected from objects to generate radar data that indicates the presence, direction, distance, and speed of objects within the field of view. A radar filtering and pre-processing module can pre-process the radar data to remove things like stationary objects, objects in undriveable areas (like radar returns from buildings) and noisy measurements/interference (e.g., due to velocity) to generate pre-processed radar data. Radar tracking can then further process the pre-processed radar data to generate the radar tracking information, which can then be used to track objects.

Cameras (or image sensors) can be spaced to provide three-hundred and sixty (360) degree image coverage of the environment surrounding the vehicle 10. The cameras capture images (e.g., image frames) and output image data (e.g., a distorted, YUV format image), which can then be processed to generate rectified (or undistorted) camera images. An image pre-processing module can process the image data by undistorting/rectifying it, pre-processing the rectified image data (e.g., image resizing and mean subtraction), and converting the rectified, pre-processed image data into rectified camera images (e.g., having a normal RGB format) that a neural network of an image classification module can classify. The image data can be rectified to correct distortions in the image can cause lines that are straight (in reality) to appear curved, for example, if point clouds in 3D space were projected onto the unrectified image data, they might actually be in the wrong place in the image because of the distortions. By rectifying the image, the projections from 3D space correspond to the correct parts of the image. The rectified camera images can then be sent to an image classification module along with other inputs including three-dimensional locations of objects from an object tracking module, and processed to generate the image classification data that can be provided to an object classification module and used to generate object classification data, which can then be sent to an object tracking module that processes the objects, the radar tracking information, and object classification data to generate object tracking information.

Lidar devices perform a scan by illuminating a target with pulses of laser light, and measure distance to a target by receiving reflected pulses back. The intensity of the reflected pulses can be collectively used by the lidar devices to generate a lidar point cloud that represents the spatial structure/characteristics of objects within the field of view. For instance, the lidar devices can use rotating laser beams that rotate to scan three-hundred and sixty (360) degrees around the vehicle. Alternatively, the lidar devices can oscillate back and forth at a certain scan frequency (i.e., how fast they oscillate) and emit pulses at a repetition rate.

Each of the lidar devices receive lidar data and process the lidar data (e.g., packets of lidar return information) to generate a lidar point cloud (e.g., a three-dimensional set of points in a three-hundred and sixty (360) degree zone around the vehicle). Each point has intensity data in addition to a three-dimensional XYZ location. For example, in one implementation, the point cloud includes a first, intermediate and last returned from each laser pulse. The lidar devices can be synchronized together (or phase locked).

Cameras can be run at their maximum frame rate, and the refresh rate of the cameras is usually much higher than the lidar devices. As lidar spins clockwise from the back of the vehicle, each camera captures images in a clockwise order during the lidar device's rotation. An extrinsic calibration procedure can provide information regarding where the cameras are pointing. The lidar devices are phase locked (i.e., scheduled to be in certain rotational positions at certain times) so it is known when the lidar devices scan certain parts of their cycle. For analysis of a scene, the system can determine which imager/camera is aligned at a point in time when certain lidar data was acquired. The system can then select whatever image was sampled/obtained closest to the point in time during which the lidar data was acquired such that only images that were captured near a certain target time (i.e., when the lidar device is looking at the same region that a camera is pointing) will be processed. As a result, camera-lidar pairs with excellent alignment can be determined. This gives lidar data at a certain heading/orientation along with corresponding image data for the scene/environment at that heading/orientation.

Lidar data of the lidar point clouds acquired by the lidar devices can be fused into a single lidar point cloud. Three-dimensional point sampling can then be performed to pre-process the lidar data (of the single lidar point cloud) to generate a set of three-dimensional points, which can then be segmented by an object segmentation module into objects that can be classified and tracked. For instance, an object classification module can include multiple classifiers that classify the objects to generate object classification data. An object tracking module can track the objects. Tracking information can then be used along with the radar tracking information and the object classification data to generate object tracking information (e.g., temporal tracking information for objects such as location, geometry, speed, etc. of objects in the environment).

The actuator system 90 includes one or more actuator devices 42a-42n that control one or more vehicle features such as, but not limited to, the propulsion system 20, the transmission system 22, a throttle system (not illustrated), the steering system 24, and the brake system 26. As will be explained below, control signals from a vehicle control module are processed to generate commands that control one or more of these actuator devices 42a-42n in accordance with the control signals 172 to schedule and execute one or more control actions to be performed to automatically control the autonomous vehicle and automate the autonomous driving task encountered in the particular driving scenario (e.g., to achieve one or more particular vehicle trajectory and speed profiles). In addition, in some embodiments, the vehicle features can further include interior and/or exterior vehicle features such as, but are not limited to, doors, a trunk, and cabin features such as air, music, lighting, etc. (not numbered).

Figure 2:
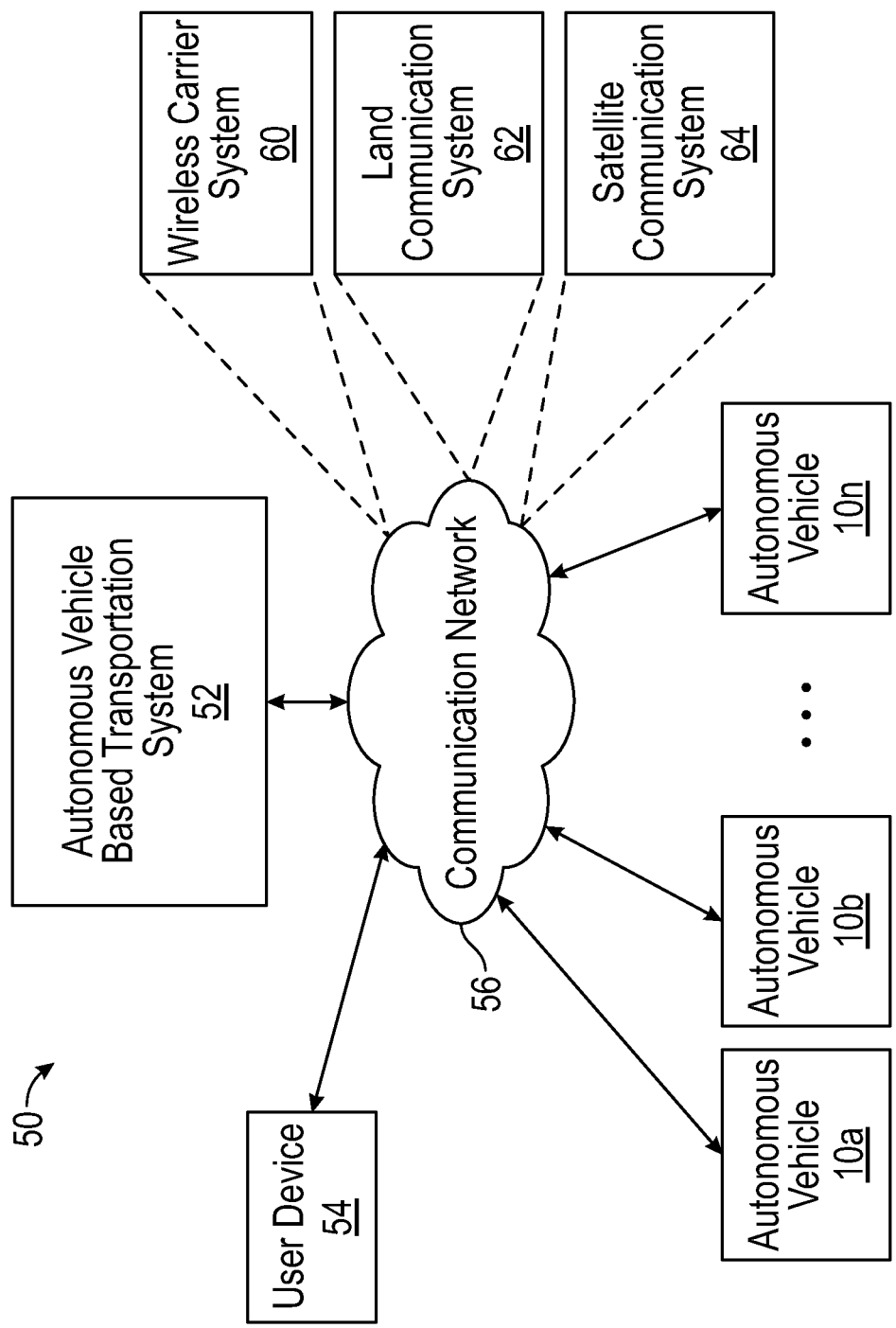
FIG. 2 is a functional block diagram illustrating a transportation system having one or more autonomous vehicles of FIG. 1 in accordance with the disclosed embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 90 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control one or more actuator devices 42a-42n that control one or more vehicle features of the autonomous vehicle 10.

In various embodiments, one or more instructions of the controller 34 are embodied in a high-level controller of an autonomous driving system (ADS) and, when executed by the processor 44 generate a vehicle trajectory and speed profile that can be processed to generate the control signals that are processed to generate commands that control one or more of actuators of the autonomous vehicle to execute one or more control actions to automatically control the autonomous vehicle (e.g., to automate the autonomous driving task encountered in the particular driving scenario).

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
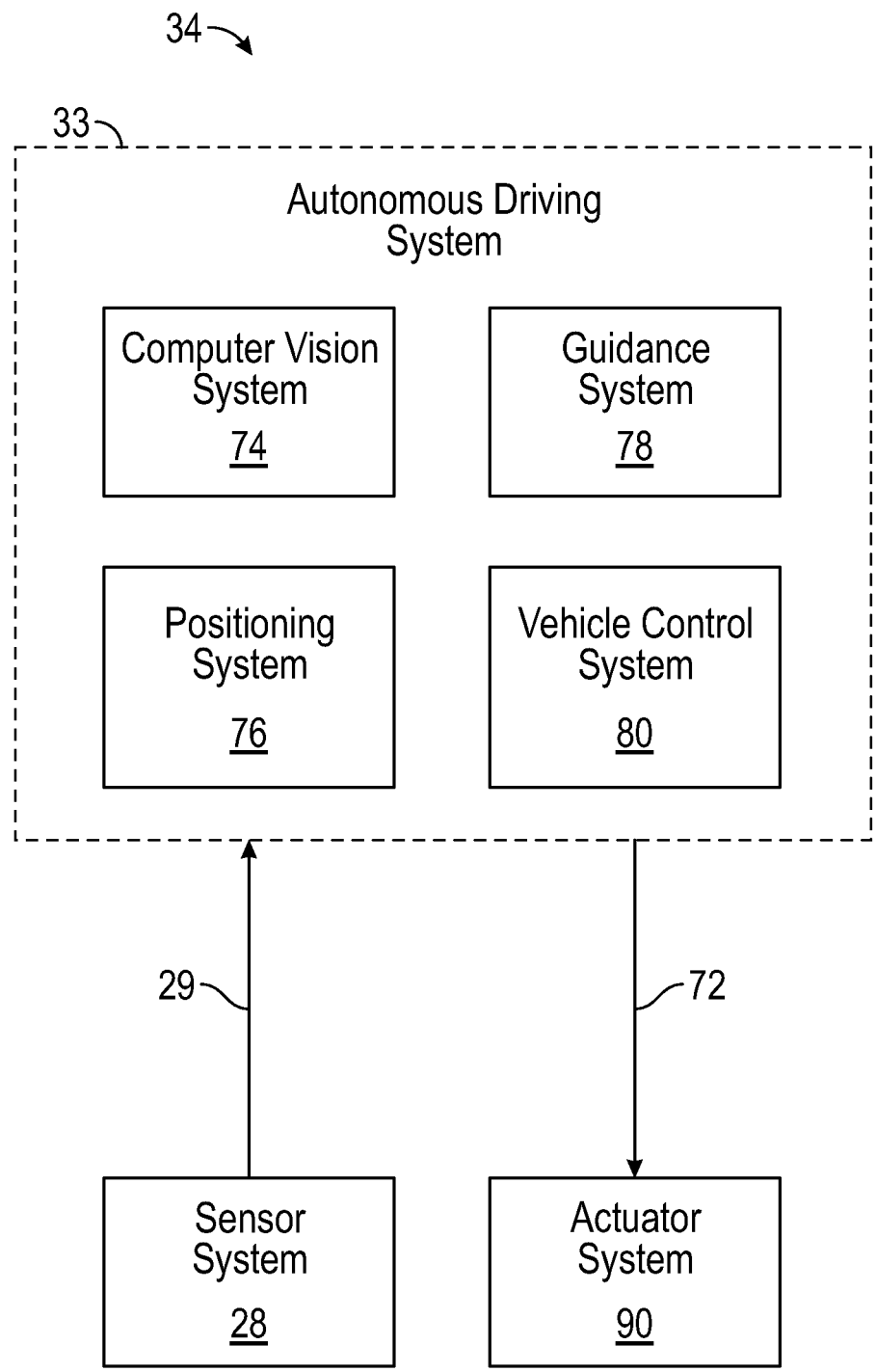
FIG. 3 is a dataflow diagram illustrating an autonomous driving system of the autonomous vehicle in accordance with the disclosed embodiments.

In accordance with various embodiments, the controller 34 implements a high-level controller of an autonomous driving system (ADS) 33 as shown in FIG. 3. That is, suitable software and/or hardware components of the controller 34 (e.g., the processor 44 and the computer-readable storage device 46) are utilized to provide a high-level controller of an autonomous driving system 33 that is used in conjunction with vehicle 10.

In various embodiments, the instructions for the high-level controller of the autonomous driving system 33 may be organized by function, module, or system. For example, as shown in FIG. 3, the high-level controller of the autonomous driving system 33 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals 72 for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the high-level controller of the ADS 33 is included within the controller 34 of FIG. 1 and can be used to implement portions of a vehicle control system that includes a sensor system, which may correspond to sensor system 28 of FIG. 3 in some embodiments.

As will now be described below with reference to FIGS. 4-9, the disclosed embodiments can provide an end-to-end learning system and methodology for learning driving commands and policies for self-driving vehicles. The end-to-end learning system uses a convolutional neural network architecture that incorporates a number of components that perform auxiliary tasks and leverages auxiliary information (aside from raw images). For example, the proposed end-to-end learning architecture incorporates image segmentation, optical flow, vehicle kinematics, and recurrence/LSTM, while also incorporating transfer learning into the end-to-end learning architecture. The disclosed embodiments can combine all of these auxiliary tasks and information into one learning system that can more efficiently learn control commands and driving policies. One benefit of training with auxiliary tasks and information is faster convergence time and higher accuracy in terms of performance, while still allowing the system to be trained end-to-end. Thus, by incorporating these additional components that perform auxiliary tasks and by leveraging auxiliary information, learning and driving performance can be improved, while maintaining the advantage of minimal training data. allowing for an end-to-end training method for learning vehicle control policies (e.g., learning steering angle).

Figure 4:
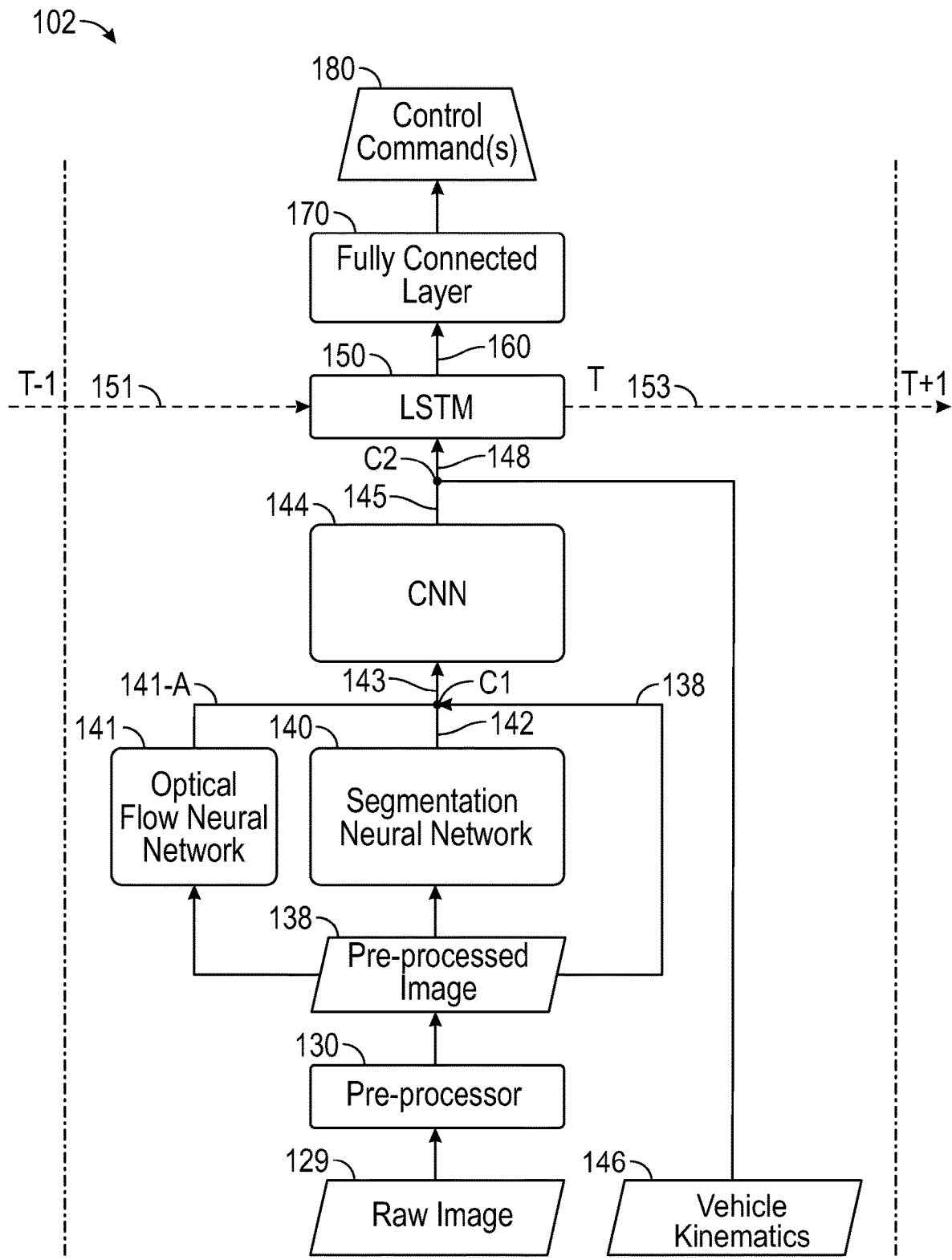
FIG. 4 is a block diagram that illustrates an end-to-end learning system in accordance with the disclosed embodiments.

FIG. 4 is a block diagram that illustrates an end-to-end learning system 102 in accordance with the disclosed embodiments. The end-to-end learning system 102 learns control commands 180 for controlling an autonomous vehicle to address a particular scene in an image. The end-to-end learning system 102 can include a pre-processor 130, a segmentation neural network 140, an optical flow neural network 141, a first concatenation unit (C1), a convolutional neural network (CNN) 144, a second concatenation unit (C2), a Long Short-Term Memory (LSTM) network 150, and a fully connected layer 170. As will be explained below, some of these neural networks (e.g., the segmentation neural network 140 and the optical flow neural network 141) are optional and not used in all implementations.

The pre-processor 130 pre-processes image data 129 acquired by sensors from the environment at a current time step (T) to generate pre-processed image data 138. It should be noted that the image data 129 in FIG. 4 can vary depending on the implementation and the environment. The environment can be a simulation environment, or a real actual driving environment when the end-to-end network architecture 102 is implemented online within a real autonomous vehicle. That is, in a simulation environment, the image data of a rendered environment scene is used as the image data 129, whereas in a real/actual driving environment, the image data is obtained through the sensors (e.g., sensors 28 in FIG. 3) sensing the driving environment (i.e., actual observations from the driving environment). Throughout this disclosure, the terms "image data" and "state" are used interchangeably. In one embodiment, the input image data 129 can be a raw, three-channel RGB images 129 takes form a front view of the autonomous vehicle (i.e., in the direction the vehicle is traveling). Pre-processing the raw image data 129 can help to calibrate images and increase the diversity of data. The pre-processing that is performed can vary depending on the implementation. One non-limiting example of the pre-processing will be described below with reference to FIG. 5.

The first concatenation unit (C1) concatenates the pre-processed image data 138 with one or more additional input(s) 141-A, 142 to generate a dynamic scene output 143 that is a concatenation of the pre-processed image data 138 and the one or more additional input(s) 141-A, 142. Data augmentation can help increase the size of the training set and the diversity of training samples. In one embodiment, the first concatenation unit (C1) concatenates the pre-processed image data 138 with one of the additional input(s) 141-A, 142 to generate the dynamic scene output 143, but in other embodiments, the first concatenation unit (C1) concatenates the pre-processed image data 138 with both additional input(s) 141-A, 142 to generate the dynamic scene output 143.

For example, in one embodiment, when the segmentation neural network 140 is implemented, the segmentation neural network 140 segments the pre-processed image data 138 to generate a segmentation map 142, in which each pixel of the pre-processed image data 138 has been assigned a label, and the first concatenation unit (C1) can then concatenate the pre-processed image data 138 with the segmentation map 142 to generate the dynamic scene output 143, which is this case is an "augmented" segmentation map. The segmentation map 142 can include one or more channels that provide a semantic understanding of the scene presented in the pre-processed image 138. For example, the segmentation map 142 can be represented as a scalar, vector, matrix, etc.

Thus, in this embodiment, image semantic segmentation (which is normally used for image recognition tasks) is incorporated as an auxiliary task for navigation to categorize/label image data at the pixel level. In other words, instead of treating image segmentation as a separate perception task, a segmentation neural network 140 is trained to perform image segmentation as an auxiliary task of learning control commands. Image segmentation can help derive better cognition of the environment and incorporates a source of dynamic or auxiliary information. Using image segmentation allows the learning system to obtain and process a segmentation map instead of directly using raw image data. One benefit of this approach is that the segmentation map 142 contains much richer information for controlling the car's behavior. For example, the segmentation map 142 can explicitly identify where the road boundary is and where the surrounding vehicles on the road are. This can make the vehicle learn its stop/go behavior or turning behavior much easier. It significantly decreases the difficulty of learning everything implicitly from the original pre-processed image. Thus, incorporating image segmentation can provide the learning system with more information and thus result in better prediction accuracy. Another benefit of using image segmentation as an auxiliary task is that this capability can be obtained offline without training extra data. For example, public image segmentation models can be applied that have been trained on a much larger dataset and the model can then be finetuned with minimal data. In one implementation, segmentation categories can include the sky, road, lane markings, building, traffic lights, pedestrian, tree, pavement, vehicle, etc.

In another embodiment, when the optical flow neural network 141 is implemented, the optical flow neural network 141 process the pre-processed image data 138 to generate an optical flow map 141-A that estimates optical flow, and the first concatenation unit (C1) can then concatenate the pre-processed image data 138 with the optical flow map 141-A to generate the dynamic scene output 143.

Optical flow is a vision methodology that used to estimate the relative movements of objects when observation changes, and can thus help recognize the movement of objects. When applied between two successive images through time, optical flow can be used to evaluate the change of environment to infer movement. In learning control commands, such as steering angles, for example, the optical flow can help to construct connections to the changing environment. As the image in a certain frame only contains static environment information, the optical flow map 141-A can serve as a good supplement of dynamic environment information. Recent advances have applied CNNs to estimate optical flow as a supervised learning task, whereas the disclosed embodiments combine optical flow as an auxiliary task. Depending on the implementation, the optical flow map can be a three-dimensional matrix, a fourth-dimensional tensor with two channels in the third dimension, or an nth-dimensional tensor with more than two channels in the third dimension.

In still another embodiment, when the both the segmentation neural network 140 and the optical flow neural network 141 are implemented, the processing at the optical flow neural network 141 can take place in parallel while the segmentation neural network 140 segments the pre-processed image data 138. In this embodiment, the first concatenation unit (C1) concatenates the pre-processed image data 138 with both the segmentation map 142 and the optical flow map 141-A to generate the dynamic scene output 143, which is another type of augmented segmentation map.

Regardless of the embodiment, after the first concatenation unit (C1) generates the dynamic scene output 143, the convolutional neural network (CNN) 144 process the dynamic scene output 143 to extract features and generate a feature map 145 of the extracted spatial features. The feature map includes a set of region vectors that collectively make up the feature map 145. Each region vector corresponds to a different region or "feature layer or column" of the dynamic scene output 143. One implementation of the CNN 144 will be described below with reference to FIG. 6.

In one embodiment, transfer learning can be applied to use pre-trained networks (e.g., from the object classification domain) to help drive the learning control commands and/or policies. This way, the learning system utilizes transfer learning (e.g., transferring knowledge from existing image recognition models) to speed up the process of training the CNN 144. For example, the CNN 144 can be pre-trained using an image data set from an image database such as ImageNet. This pre-training allows the initial weights of the CNN 144 to be set or "pre-trained" prior to the processing the dynamic scene output 143 (or the augmented segmentation map) to generate the feature map 145. The initial weights can then be further fine-tuned during training by the CNN 144. This pre-training technique not normally used to train a CNN that is being used to learn control commands. The CNN can learn a generic set of features, and recognize a large variety of objects with high accuracy. The intermediate features learned are found to have universal expressiveness across multiple domains.

The second concatenation unit (C2) concatenates vehicle kinematics 146 with the extracted spatial features from the feature map 145 to generate a spatial context feature vector 148. The vehicle kinematics 146 can include, for example, one or more of vehicle acceleration rate, vehicle speed, vehicle heading, vehicle lateral distance to road boundary, vehicle previous steering angle, and vehicle steering torque. The spatial context feature vector 148 includes context features that describe a current context at the current time step (T). As used herein, the term "context" can refer to a state of the current environment and a current state of the vehicle. Thus, at this step, the learning system combines vehicle kinematic information with image input at a sensor fusion step to incorporate another source of dynamic or auxiliary information that can make the state representation more concrete and help boost performance. The kinematic information allows the vehicle's behavior to be better estimated, and helps to ensure that the vehicle does not execute a driving behavior that is against some physical rules.

Decision making for an autonomous vehicle is not an independent choice at every time step. By analogy, a human would consider past environment information and previous actions taken and then make a consistent decision of driving behavior. As such, it would be desirable for the learning system to do the same and not only rely on the current state, but also incorporate past states. To deal with temporal dependencies, a recurrent module (e.g., the LSTM network 150) is introduced (along with the and optical flow NN 141) are introduced to help extract and incorporate temporal information to help improve the current action choices.

Driving is a Partially-Observable Markov Decision Process (POMDP). To deal with partial observability, recurrence is introduced to better estimate the underlying true environment state. More specifically, recurrence is added via the LSTM network 152 to include temporal dependencies. The LSTM network 152 is a recurrent neural network (RNN) module of LSTM cells, and can also be referred to as a recurrent neural network (RNN) herein. Each LSTM cell can process data sequentially and keep its hidden state through time. For reference, one example of an LSTM cell will be described below with reference to FIG. 7.

The LSTM network 150 processes the spatial context feature vector 148 at the current time step (T) and previous information about the environment. More specifically, during the current time step (T), the LSTM network 150 processes the spatial context feature vector 148 and one or more previous LSTM outputs 151 (at one or more corresponding previous time steps) ($h_{t-1} = o_{t-1} * \tan h(C_{t-1})$) to generate an encoded temporal context vector 160 at the current time step (T) ($o_t = \sigma(W_o[h_{t-1}, x_t] + b_o)$), and another LSTM output 153. Each of the one or more previous LSTM outputs 151 is a context feature vector which is the final hidden state from a particular previous time step. The LSTM output 153 is used by the LSTM network 150 at the next time step (T+1) along with a next spatial context feature vector (not shown in FIG. 4) generated at the next time step (T+1) time step to generate another encoded temporal context vector (not shown in FIG. 4) at the next time step (T+1). At each subsequent time step, this processing at the LSTM network 150 repeats.

In one embodiment, the number of previous LSTM outputs 151 is specified by a window size (w) that defines the number of the previous LSTM outputs 151 to be processed by the LSTM network 150 (along with the spatial context feature vector 148) to generate the encoded temporal context vector 160 at the current time step (T). For example, in one embodiment, the LSTM network 150 processes the spatial context feature vector (v) 148 in a sliding window of size (w). This implies the control command 180 prediction result is dependent on w past input observations ($X_{t-w+1} - X_t$). By changing the parameter of w, how long the system takes to make the decision can be altered. For example, smaller values of w lead to shorter-term memory, so it has faster reaction time but is prone to sudden sensor failure. Larger values of w, on the contrary, lead to a much smoother and stable behavior. The downside of larger values of w is that it requires longer training time and test time for choosing actions. The LSTM network 150 fuses the w past context feature vectors 151 (past hidden states) and current spatial context feature vector 148 (T−w, T−(w−1), . . . T−1, T) and then learns a temporal-aware model. This representation can alleviate the problem brought by the Partially Observable Markov Decision Process (POMDP) environment.

The fully connected layer 170 process the encoded temporal context vector 160 to learn/compute one or more control commands 180. As used herein, the term "fully connected layer" refers to a layer in which each neuron receives input from every element of the previous layer. In other words, a fully connected layer connects every neuron in one layer to every neuron in another layer such that neurons in the fully connected layer have connections to all activations in the previous layer. Each control command 180 comprises at least one of: a steering angle control command, an acceleration rate control command, or a brake rate control command. In other words, depending on the implementation, the output 180 generated by the fully connected layer can be a scalar that specifies a single control command (e.g., a steering angle control command, or an acceleration rate control command, or a brake rate control command) or a two-dimensional vector that specifies a steering angle control command and either an acceleration rate control command (positive value) or a brake rate control command (negative value).

Once the control commands 180 have been learned/generated they can be deployed to AI driver agent systems used in vehicles to control operation of the vehicles as will be described below with reference to FIG. 8. Prior to describing FIG. 8 some possible non-limiting implementations of the pre-processor 130, the feature extraction CNN 144, and an LSTM cell of the LSTM network 152 will be described with reference to FIGS. 5-8, respectively.

Figure 5:
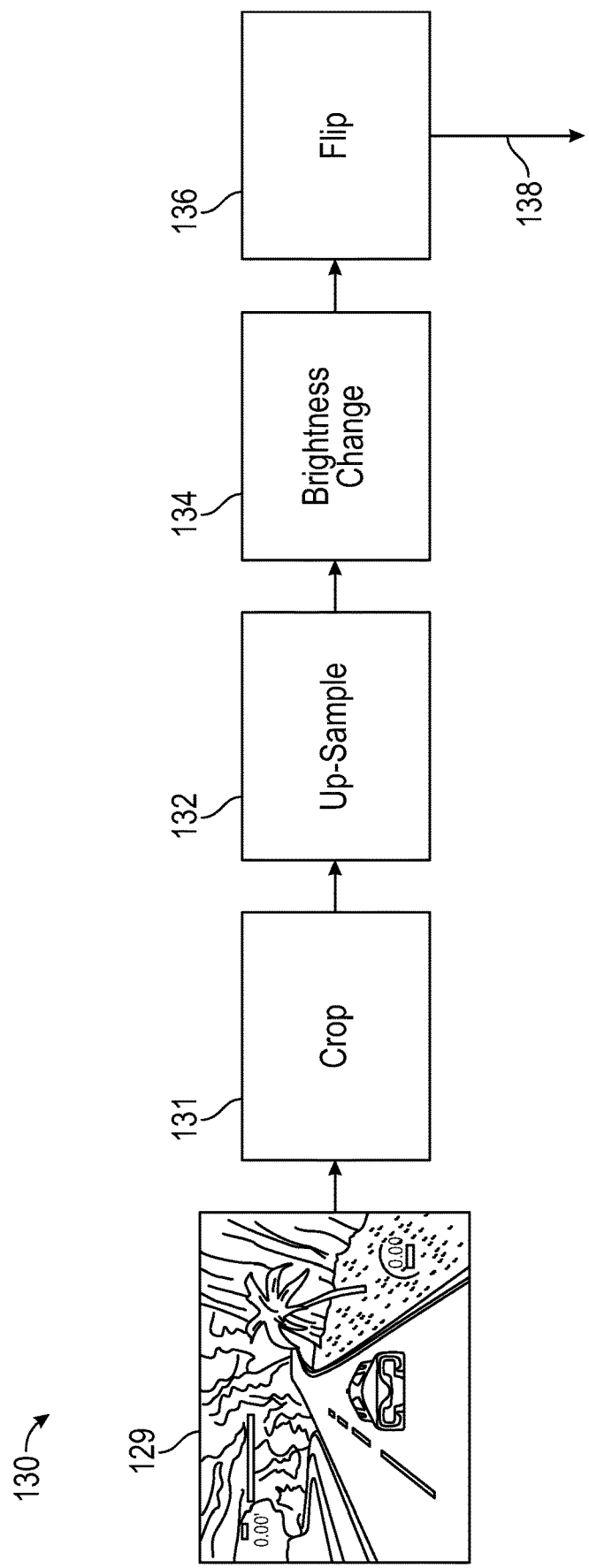
FIG. 5 is a block diagram that illustrates one exemplary implementation of an image pre-processor shown in FIG. 4 in accordance with the disclosed embodiments.

FIG. 5 is a block diagram that illustrates one exemplary implementation of a pre-processor 130 shown in FIG. 4 in accordance with the disclosed embodiments. In this embodiment, the pre-processor 130 can include one or more of a cropping module 131, an upsampling module 132, a brightness change module 134, and a flipping module 136. This implementation is non-limiting, and it should be appreciated that depending on the implementation, some or all of the steps shown can be performed. In addition, it should be appreciated that other types of pre-processing techniques could be incorporated into the pre-processor 130 depending on the implementation.

The cropping module 131 crops the image data 129 to remove extraneous elements and generate cropped image data. For example, in an image which includes a large area of sky or mountain tops, the top of the image can be removed from the image data. As another example, in an image which includes a car hood, the bottom of the image can be removed from the image data.

The upsampling module 132 upsamples the cropped image data to generate upsampled image data that has been cropped. To illustrate an example with respect to training a steering angle command, in an original training set, most scenarios are going straight along the road. As such, images with a steering angle larger than 15 degrees are scarce in comparison to the significantly greater number of training samples having a steering angle less than 5 degrees, which means the steering angle distribution is strongly biased towards zero. To overcome the problem of imbalanced data, images with a steering angle greater than 10 degrees can be manually upsampled by ten times, while images with a steering angle greater than 5 degrees can be manually upsampled by five times. The upsampled image data can then be then randomly shuffled before training.

The brightness change module 134 can apply a brightness change to the upsampled image data to brighten it to generate brightened-upsampled image data. Each image frame is first converted to HSV space and a value channel is then multiplied by a random value from 0 to 10. This changes the lighting situation and makes the model adaptive to all kinds of weather.

The flipping module 136 can flip all frames of the image data to obtain a mirror image in a horizontal direction. This helps ensure, for example, that the amount of left and right turning samples are exactly the same so that learning will not suffer from any bias in the left or right direction After all the pre-processing steps are complete, the pre-processor 130 can output the pre-processed image data 138 to the CNN 144, the optical flow NN 141, and/or the segmentation NN 140.

Figure 6:
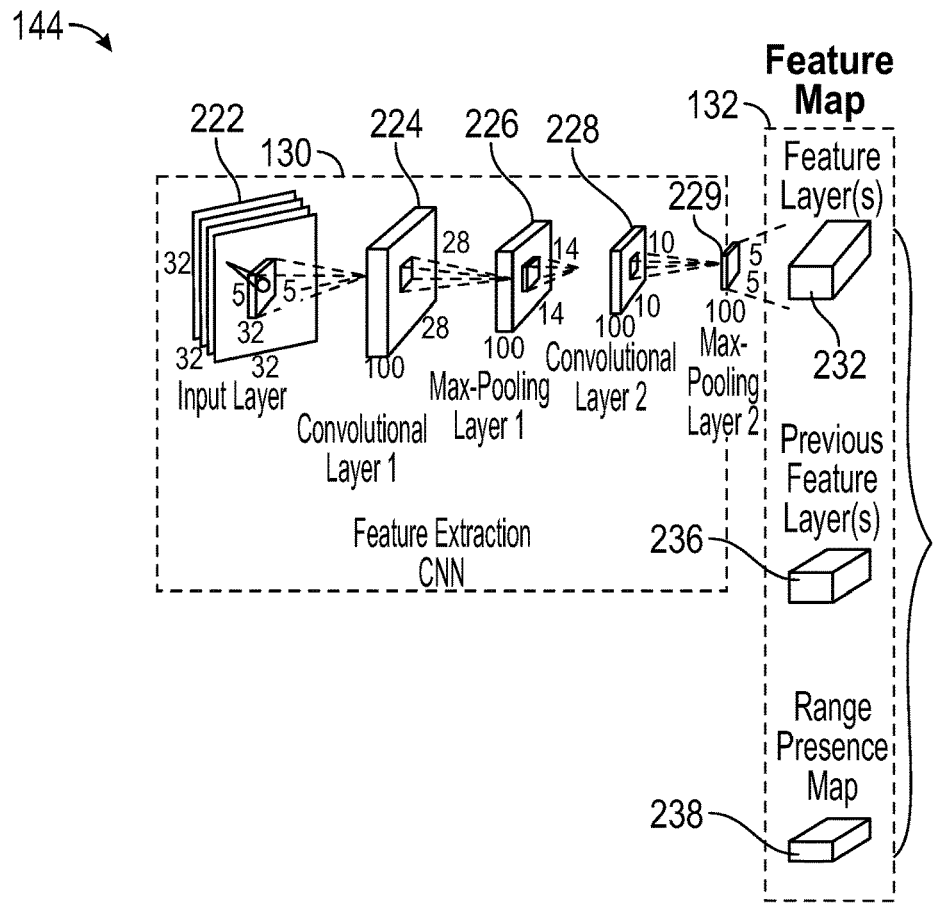
FIG. 6 is a block diagram that illustrates one exemplary implementation of the feature extraction CNN shown in FIG. 4 in accordance with the disclosed embodiments.

FIG. 6 is a block diagram that illustrates one exemplary implementation of the feature extraction CNN 144 shown in FIG. 4 in accordance with the disclosed embodiments.

A CNN is a class of deep, feed-forward artificial neural networks. They are also known as shift invariant or space invariant artificial neural networks (SIANN), based on their shared-weights architecture and translation invariance characteristics. A CNN architecture is formed by a stack of distinct layers that transform the input volume into an output volume through a differentiable function. A few distinct types of layers are commonly used called convolution layers and max-pooling layers. A convolutional layer's parameters consist of a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map.

When dealing with high-dimensional inputs such as images, it is impractical to connect neurons to all neurons in the previous volume because such a network architecture does not take the spatial structure of the data into account. Convolutional networks exploit spatially local correlation by enforcing a local connectivity pattern between neurons of adjacent layers: each neuron is connected to only a small region of the input volume. The extent of this connectivity is a hyperparameter called the receptive field of the neuron. The connections are local in space (along width and height), but always extend along the entire depth of the input volume. Such an architecture ensures that the learnt filters produce the strongest response to a spatially local input pattern.

Three hyperparameters control the size of the output volume of the convolutional layer: the depth, stride and zero-padding. The depth of the output volume controls the number of neurons in a layer that connect to the same region of the input volume. These neurons learn to activate for different features in the input. For example, if the first convolutional layer takes the raw image as input, then different neurons along the depth dimension may activate in the presence of various oriented edges, or blobs of color. Stride controls how depth columns around the spatial dimensions (width and height) are allocated. When the stride is 1 then we move the filters one pixel at a time. This leads to heavily overlapping receptive fields between the columns, and also to large output volumes. When the stride is 2 (or rarely 3 or more) then the filters jump 2 pixels at a time as they slide around. The receptive fields overlap less and the resulting output volume has smaller spatial dimensions. Sometimes it is convenient to pad the input with zeros on the border of the input volume. The size of this padding is a third hyperparameter. Padding provides control of the output volume spatial size. In particular, sometimes it is desirable to exactly preserve the spatial size of the input volume.

The spatial size of the output volume can be computed as a function of the input volume size W, the kernel field size of the Cony Layer neurons K, the stride with which they are applied S, and the amount of zero padding P used on the border. The formula for calculating how many neurons "fit" in a given volume is given by $(W-K+2P)/S+1$. If this number is not an integer, then the strides are set incorrectly and the neurons cannot be tiled to fit across the input volume in a symmetric way. In general, setting zero padding to be $P=(K-1)/2$ when the stride is $S=1$ ensures that the input volume and output volume will have the same size spatially. Though it's generally not completely necessary to use up all of the neurons of the previous layer, for example, just a portion of padding may be used. A parameter sharing scheme is used in convolutional layers to control the number of free parameters. It relies on one reasonable assumption: That if a patch feature is useful to compute at some spatial position, then it should also be useful to compute at other positions. In other words, denoting a single 2-dimensional slice of depth as a depth slice, the neurons are constrained in each depth slice to use the same weights and bias. Since all neurons in a single depth slice share the same parameters, then the forward pass in each depth slice of the CONV layer can be computed as a convolution of the neuron's weights with the input volume (hence the name: convolutional layer). Therefore, it is common to refer to the sets of weights as a filter (or a kernel), which is convolved with the input. The result of this convolution is an activation map, and the set of activation maps for each different filter are stacked together along the depth dimension to produce the output volume. Parameter sharing contributes to the translation invariance of the CNN architecture. Sometimes the parameter sharing assumption may not make sense. This is especially the case when the input images to a CNN have some specific centered structure, in which completely different features are to be learned on different spatial locations.

Another important concept of CNNs is pooling, which is a form of non-linear down-sampling. There are several non-linear functions to implement pooling including max pooling. Max pooling layers can be inserted between successive convolutional layers of the CNN architecture. In max pooling the input image is partitioned into a set of non-overlapping rectangles and, for each such sub-region, outputs the maximum. The pooling layer serves to progressively reduce the spatial size of the representation, to reduce the number of parameters and amount of computation in the network, and hence to also control overfitting. The pooling operation provides another form of translation invariance. Each max pooling layer operates independently on every depth slice of the input and resizes it spatially. The most common form is a pooling layer with filters of size 2×2 applied with a stride of 2 downsamples at every depth slice in the input by 2 along both width and height, discarding 75% of the activations. In this case, every max operation is over 4 numbers. The depth dimension remains unchanged.

Max-pooling allows CNNs to take advantage of the 2D structure of input data. As such, CNNs are suitable for processing visual and other two-dimensional data. They can be trained with standard backpropagation. CNNs are easier to train than other regular, deep, feed-forward neural networks and have many fewer parameters to estimate.

Referring again to FIG. 6, this non-limiting implementation includes a number of stages or layers including a first convolutional layer 224, a first max-pooling layer 226, a second convolutional layer 228, and a second max-pooling layer 229. However, it should be appreciated depending on the implementation, the feature extraction CNN 144 could include any number of layers required to generate a feature layer 232 based on the dynamic scene output 143 that is input.

The feature extraction CNN 144 receives the dynamic scene output 143 as an input layer 222. The dynamic scene output 143 can include the pre-processed image data 138 that includes pre-processed pixel information or data (e.g., pixels) and the other sources of information 141-A, 142 mentioned above with reference to FIG. 4. The different layers 224, 226, 228, 229 of the feature extraction CNN 144 can process the dynamic scene output 143 to extract various features to produce a feature layer 232. To explain further, each layer 224, 226, 228, 229 of the feature extraction CNN 144 is configured to successively process pixels of the dynamic scene output 143 to further extract features from the dynamic scene output 143 and output feature layers 232, 236.

In one embodiment, the input layer 222 can be a concatenation of the input images of red-blue-green channel augmented by the optical flow map 141-A and/or the segmentation map 142 to generate overall input to the neural network. A first convolutional layer 224 is configured to apply a first bank of convolutional kernels to an input layer 222. For example, the input to the first convolutional layer 224 can be convoluted with a bank of convolutional kernels to generate output neural activations through a non-linear activation function such as a rectified linear unit (ReLU) function. Each convolutional kernel generates a first layer output channel that comprises an image having a first resolution. A first max-pooling layer 226 is configured to process each first output channel by applying a maximum value operation to that first output channel to down-scale the corresponding image and generate a down-scaled map having the first resolution. The first max-pooling layer 226 outputs a plurality of second output channels that each comprise an image having a second resolution that is less than the first resolution. A second convolutional layer 228 configured to apply a second bank of convolutional kernels to each of the plurality of second output channels. Each convolutional kernel of the second bank generates a third output channel that comprises an image having a third resolution that is less than the second resolution. For example, the input to the second convolutional layer 228 can be convoluted with another bank of convolutional kernels to generate output neural activations through a non-linear activation function such as a ReLU function. A second max-pooling layer 229 configured to process each third output channel by applying another maximum value operation to that third output channel to down-scale the corresponding image and generate a down-scaled map having the third resolution. The second max-pooling layer 229 outputs a plurality of fourth output channels that each comprise an image having a fourth resolution that is less than the third resolution. The feature layer comprises a three-dimensional tensor comprising the plurality of fourth output channels.

The feature extraction CNN 144 concatenates each feature layer 232 with a previous feature layer 236 and a range presence map 238 to generate and output the feature map 132. The feature map 132 is the concatenated layers from feature layer 232, the previous feature layer 236, and the range presence map 238. In other words, the concatenation of range presence map 238, the current vision-based feature map 232 and a previous vision-based feature map 236 from a previous time instant form the whole feature map 132.

Figure 7:
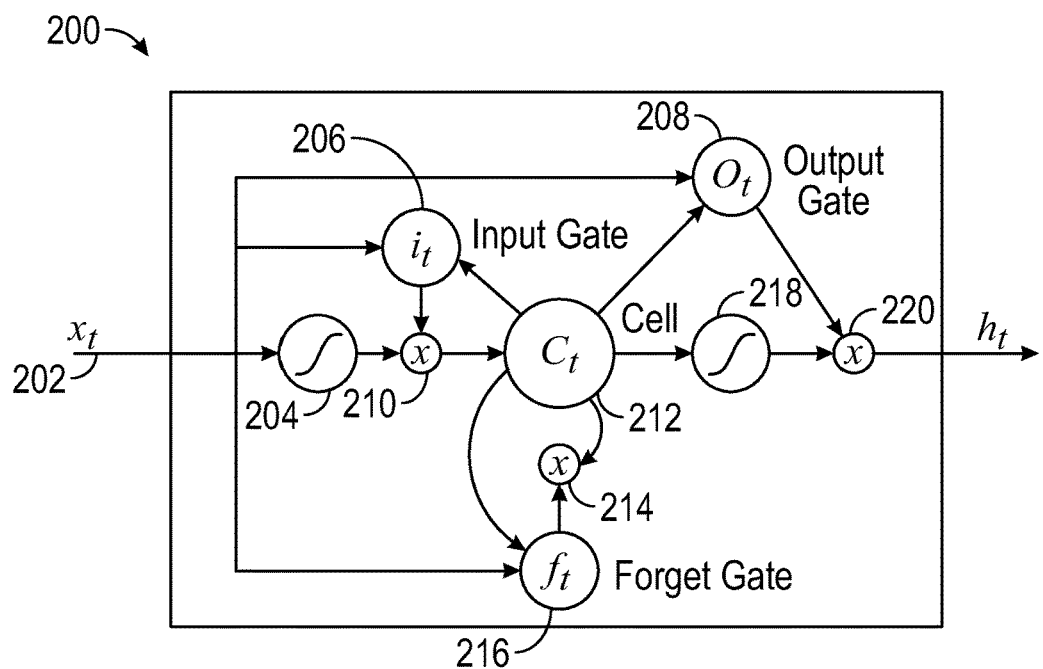
FIG. 7 is a block diagram of one non-limiting example of an LSTM cell that can be implemented as part of a LSTM network of LSTM cells in accordance with the disclosed embodiments.

FIG. 7 is a block diagram of one non-limiting example of an LSTM cell 200 that can be implemented as part of a LSTM network 152 of LSTM cells. The LSTM cell includes 200 input (i), output (o), and forget (f) gates 206, 208, 216. Each of these gates 206, 208, 216 can be thought as a "standard" neuron in a feed-forward (or multi-layer) neural network: that is, they compute an activation (using an activation function) of a weighted sum. $i_t$, $o_t$ and $f_t$ represent the activations of respectively the input, output and forget gates 206, 208, 216, at time step t. The three exit arrows from the memory cell c 212 to the three gates i, o and f 206, 208, 216 represent the peephole connections. These peephole connections denote the contributions of the activation of the memory cell c 212 at time t−1, i.e. the contribution $c_{t-1}$ (and not $c_t$, as the picture may suggest). In other words, the gates i, o and f 206, 208, 216 calculate their activations at time step t (i.e., respectively, $i_t$, $o_t$ and $f_t$) also considering the activation of the memory cell c 212 at time step t−1, i.e. $c_{t-1}$. The single left-to-right arrow exiting the memory cell is not a peephole connection and denotes $c_t$. The little circles 210, 214, 202 containing a x symbol represent an element-wise multiplication between its inputs. The big circles 204, 218 containing an S-like curve represent the application of a differentiable function (like the sigmoid function) to a weighted sum. It should be appreciated that the LTSM cell 200 of FIG. 7C is non-limiting that that other kinds of LSTM cells could be implemented within the LSTM network 152 as well.

Figure 8:
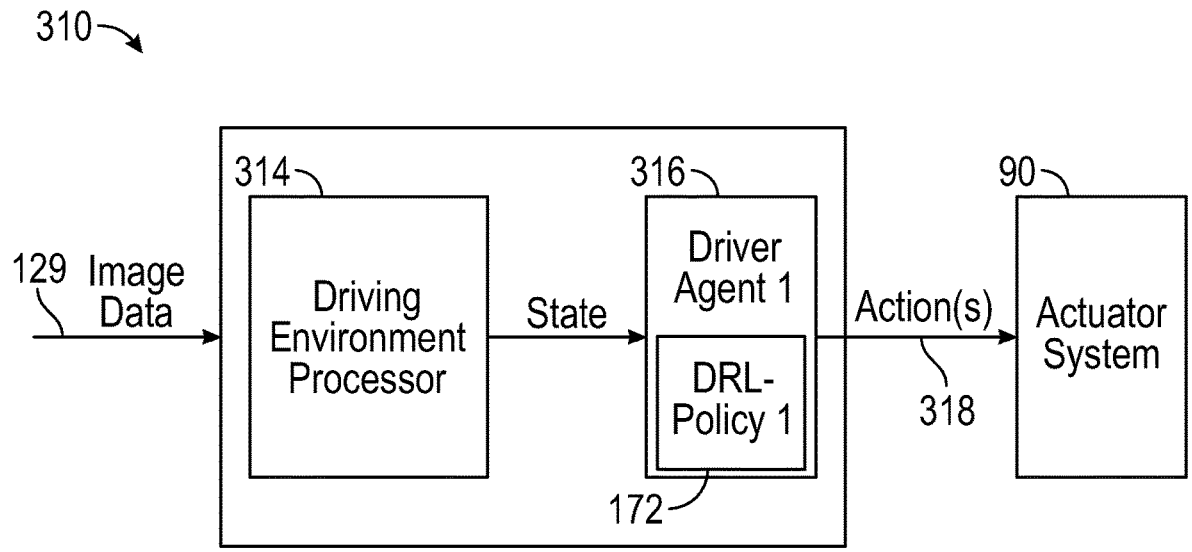
FIG. 8 is a block diagram that illustrates an AI driver agent system that includes a driving environment processor and an artificial intelligence (AI) based autonomous driver agent module in accordance with the disclosed embodiments.

FIG. 8 is a block diagram that illustrates an AI driver agent system 310 that includes a driving environment processor 314, and an artificial intelligence (AI) based autonomous driver agent module 316 in accordance with the disclosed embodiments. FIG. 8 illustrates interactions between the driving environment processor 314 and its corresponding AI based autonomous driver agent module 316 based on the driving environments observed by the driving environment processor 314. The driver agent 316 follows a policy 172 to generate an action (A) 318 which is then interpreted to generate commands 180 for driving the vehicle in a particular driving environment as observed by the driving environment processor 314. Each policy 172 can process state (S) of the driving environment (as observed by the driving environment processor 314), and generate actions (A) 318 that are used to control a particular AV that is operating in that state (S) of the driving environment. The variations in the driving environment can include, for example different start/goal positions, different traffic configurations, different road configurations, different lighting/weather/visibility conditions, etc.

In one embodiment, the actions (A) 318 generated by the driver agent 316 are control commands 180 (FIG. 4) that are sent to control one or more of actuator devices of actuator system 90 to schedule and execute one or more control actions to be performed to automatically control the autonomous vehicle and automate the autonomous driving task encountered in a particular driving scenario (e.g., to achieve one or more particular vehicle trajectory and speed profiles). In one embodiment, a command interpreter or validator (not illustrated in FIGS. 8 and 9) can process the actions prior to them being send to the actuator system 90 to ensure that the commands are within acceptable limits. To explain further with reference to FIGS. 3 and 3, the actions of FIG. 8 are equivalent to the control signals 72 of FIG. 3. As described above with reference to FIG. 3, in one embodiment, the actuator system 90 includes a plurality of actuators of the vehicle (e.g., a steering torque or angle controller that is controlled by steering angle control commands, a brake system that is controlled by brake control commands, a throttle system that is controlled by acceleration control commands, etc.). The the action (or control signals 72 of FIG. 3) are used to generate signals that control the actuators (actuator devices 42a-42n of FIG. 3) in accordance with the action (or control signals 72 of FIG. 3) to schedule and execute one or more control actions to be performed to automate driving tasks. The one or more control actions automatically control the autonomous vehicle to automate an autonomous driving task encountered in a particular driving scenario (e.g., to achieve a particular vehicle trajectory and speed profile).

Figure 9:
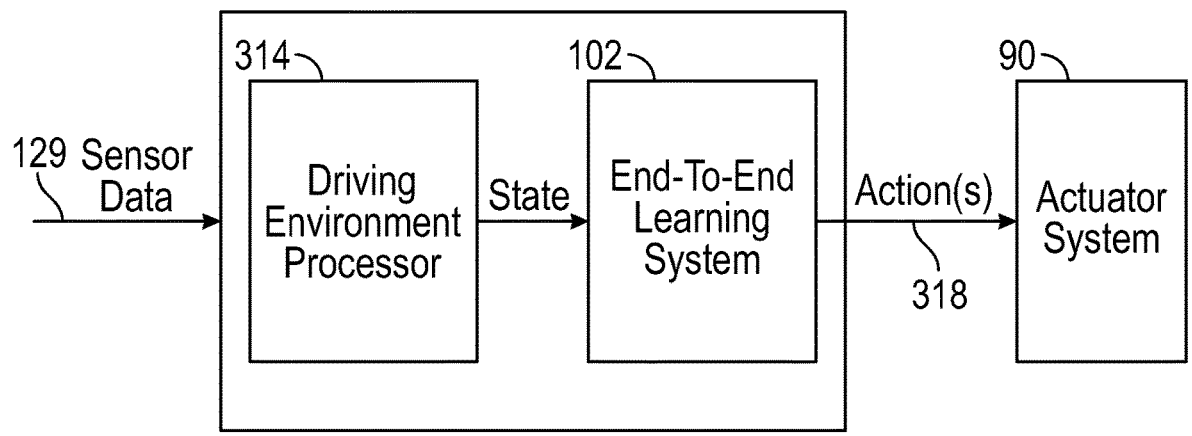
FIG. 9 is a block diagram that illustrates an online learning system that includes a driving environment processor and an artificial intelligence (AI) based autonomous driver agent module that implements the end-to-end learning system in accordance with the disclosed embodiments.

Alternatively, in some implementations, the end-to-end learning system 102 of FIG. 4 can implemented online within a real autonomous vehicle to acquire actual image data through the sensors (e.g., sensors 38 in FIG. 3), sense the driving environment (i.e., actual observations from the driving environment) and further train the system in a real or actual driving environment as will be described in greater detail below with reference to FIG. 9. FIG. 9 is a block diagram that illustrates an online learning system that includes a driving environment processor 314, and an artificial intelligence (AI) based autonomous driver agent module that implements the end-to-end network architecture 102 in accordance with the disclosed embodiments. In this embodiment, the vehicle that the online learning system is deployed within utilizes the end-to-end network architecture 102 to learn and update learn control commands (e.g., steering angle control commands, acceleration rate control commands, and/or a brake rate control commands) that control an autonomous vehicle in real time, while also performing the various other functions of the driver agent 316 as described above with reference to FIG. 8.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:
1. A method for controlling an autonomous vehicle, the method comprising:
pre-processing, by a pre-processor, image data acquired by sensors of the autonomous vehicle from an environment at a current time step (T) to generate pre-processed image data;
concatenating, by a processor, the pre-processed image data with at least one additional input to generate a dynamic scene output that is a concatenation of the pre-processed image data and the at least one additional input;
processing, by the processor, the dynamic scene output with a convolutional neural network (CNN) to generate a feature map comprising extracted spatial features;
concatenating, by the processor, vehicle kinematics with the extracted spatial features from the feature map to generate a spatial context feature vector comprising context features that describe a current context at the current time step (T);
processing, by the processor and using a Long Short-Term Memory (LSTM) network comprising a network of LSTM cells during the current time step (T), the spatial context feature vector at the current time step (T) and one or more previous LSTM outputs at one or more corresponding previous time steps to generate an encoded temporal context vector at the current time step (T);
processing, by the processor, the encoded temporal context vector with a fully connected layer to learn one or more control commands, wherein each control command comprises at least one of: a steering angle control command, an acceleration rate control command, or a brake rate control command; and
generating, by a controller of the autonomous vehicle, one or more control signals based the one or more control commands.
2. The method according to claim 1, further comprising:
segmenting the pre-processed image data at a segmentation neural network to generate a segmentation map in which each pixel of the pre-processed image data has been assigned a label; and
wherein concatenating the pre-processed image data with the at least one additional input to generate the dynamic scene output, comprises:
concatenating the pre-processed image data with the segmentation map to generate the dynamic scene output, wherein the dynamic scene output comprises an augmented segmentation map.
3. The method according to claim 1, further comprising:
processing the pre-processed image data at an optical flow neural network to generate an optical flow map that estimates optical flow; and
wherein concatenating the pre-processed image data with the at least one additional input to generate the dynamic scene output, comprises:
concatenating the pre-processed image data with the optical flow map to generate the dynamic scene output.
4. The method according to claim 1, further comprising:
segmenting the pre-processed image data at a segmentation neural network to generate a segmentation map in which each pixel of the pre-processed image data has been assigned a label; and
processing the pre-processed image data at an optical flow neural network to generate an optical flow map that estimates optical flow, wherein the processing the pre-processed image data at the optical flow neural network takes place in parallel with the segmenting the pre-processed image data at the segmentation neural network; and
wherein concatenating the pre-processed image data with the at least one additional input to generate the dynamic scene output, comprises:
concatenating the pre-processed image data with the segmentation map and the optical flow map to generate the dynamic scene output, wherein the dynamic scene output comprises an augmented segmentation map.

5. The method according to claim 1, wherein each of the one or more previous LSTM outputs is a context feature vector from a particular previous time step.

6. The method according to claim 5, wherein a number of one or more previous LSTM outputs is specified by a window size (w) that defines the number of the one or more previous LSTM outputs to be processed by the LSTM network along with the spatial context feature vector to generate the encoded temporal context vector at the current time step (T).

7. The method according to claim 1, wherein the CNN comprises:
a pre-trained CNN that has been pre-trained using an image data set from an image database, wherein initial weights of the pre-trained CNN are set prior to the step of processing the augmented segmentation map to generate the feature map and then fine-tuned during training.

8. The method according to claim 1, wherein pre-processing, at the pre-processor, image data acquired by the sensors from an environment at the current time step (T) to generate the pre-processed image data, comprises:
cropping, at a cropping module, the image data to remove extraneous elements and generate cropped image data;
upsampling the cropped image data, at an upsampling module, to generate upsampled image data;
applying a brightness change, at a brightness change module, to brighten the upsampled image data to generate brightened-upsampled image data; and
flipping the brightened-upsampled image data, at a flipping module, to obtain a mirror image in a horizontal direction to generate the pre-processed image data.

9. The method according to claim 1, wherein the vehicle kinematics comprise one or more of: vehicle acceleration rate, vehicle speed, vehicle heading, vehicle lateral distance to road boundary, vehicle previous steering angle, and vehicle steering torque.

10. A system for controlling an autonomous vehicle, the system comprising:
a pre-processor configured to pre-process image data acquired by sensors from an environment at a current time step (T) to generate pre-processed image data;
a non-transitory computer readable medium comprising:
a first concatenation unit configured to, by a processor, concatenate the pre-processed image data with at least one additional input to generate a dynamic scene output that is a concatenation of the pre-processed image data and the at least one additional input;
a convolutional neural network (CNN) configured to, by the processor, process the dynamic scene output to generate a feature map comprising extracted spatial features;
a second concatenation unit configured to, by the processor, concatenate vehicle kinematics with the extracted spatial features from the feature map to generate a spatial context feature vector comprising context features that describe a current context at the current time step (T);
a Long Short-Term Memory (LSTM) network comprising a network of LSTM cells, the LSTM network being configured to, by the processor, process, during the current time step (T), the spatial context feature vector at the current time step (T) and one or more previous LSTM outputs at one or more corresponding previous time steps to generate an encoded temporal context vector at the current time step (T);
a fully connected layer configured to, by the processor, process the encoded temporal context vector to learn one or more control commands, wherein each control command comprises at least one of: a steering angle control command, an acceleration rate control command, or a brake rate control command; and
a controller configured to, by a processor, generate one or more control signals based the one or more control commands.

11. The system according to claim 10, further comprising:
a segmentation neural network configured to segment the pre-processed image data to generate a segmentation map in which each pixel of the pre-processed image data has been assigned a label; and
wherein the first concatenation unit is configured to concatenate the pre-processed image data with the segmentation map to generate the dynamic scene output, wherein the dynamic scene output comprises an augmented segmentation map.

12. The system according to claim 10, further comprising:
an optical flow neural network configured to process the pre-processed image data to generate an optical flow map that estimates optical flow; and
wherein the first concatenation unit is configured to concatenate the pre-processed image data with the optical flow map to generate the dynamic scene output.

13. The system according to claim 10, further comprising:
a segmentation neural network configured to segment the pre-processed image data to generate a segmentation map in which each pixel of the pre-processed image data has been assigned a label; and
an optical flow neural network configured to process the pre-processed image data to generate an optical flow map that estimates optical flow, wherein the processing at the optical flow neural network takes place in parallel with the segmenting of the pre-processed image data at the segmentation neural network; and
wherein the first concatenation unit is configured to concatenate the pre-processed image data with the segmentation map and the optical flow map to generate the dynamic scene output, wherein the dynamic scene output comprises an augmented segmentation map.

14. The system according to claim 10, wherein each of the one or more previous LSTM outputs is a context feature vector from a particular previous time step.

15. The system according to claim 14, wherein a number of one or more previous LSTM outputs is specified by a window size (w) that defines the number of the one or more previous LSTM outputs to be processed by the LSTM network along with the spatial context feature vector to generate the encoded temporal context vector at the current time step (T).

16. The system according to claim 10, wherein the CNN comprises:
a pre-trained CNN that has been pre-trained using an image data set from an image database, wherein initial weights of the pre-trained CNN are set prior to the step of processing the augmented segmentation map to generate the feature map and then fine-tuned during training.

17. The system according to claim 10, wherein the pre-processor comprises:
a cropping module configured to crop the image data to remove extraneous elements and generate cropped image data;

an upsampling module configured to upsample the cropped image data to generate upsampled image data;

a brightness change module configured to apply a brightness change to the upsampled image data to brighten the upsampled image data to generate brightened-upsampled image data; and a flipping module configured to flip the brightened-upsampled image data to obtain a mirror image in a horizontal direction to generate the pre-processed image data.

18. An autonomous vehicle, comprising:

an end-to-end learning system stored on a non-transitory computer readable medium deployed within the autonomous vehicle and being configured to, by a processor, learn control commands that control the autonomous vehicle, wherein each control command comprises at least one of: a steering angle control command, an acceleration rate control command, or a brake rate control command;

a driving environment processor configured to acquire image data from a current observed environment;

a controller configured to control, by a processor, the autonomous vehicle at each time step based on the current observed environment by issuing instructions to execute one or more of the control commands;

wherein the end-to-end learning system comprises:

a processor configured to execute instructions of a computer program for learning the commands, which, when executed by the processor are configurable to perform a method comprising:

pre-processing, at a pre-processor, image data acquired by sensors from the environment at a current time step (T) to generate pre-processed image data;

concatenating the pre-processed image data with at least one additional input to generate a dynamic scene output that is a concatenation of the pre-processed image data and the at least one additional input;

processing, at a convolutional neural network (CNN), the dynamic scene output to generate a feature map comprising extracted spatial features;

concatenating vehicle kinematics with the extracted spatial features from the feature map to generate a spatial context feature vector comprising context features that describe a current context at the current time step (T);

processing, at a Long Short-Term Memory (LSTM) network comprising a network of LSTM cells during the current time step (T), the spatial context feature vector at the current time step (T) and one or more previous LSTM outputs at one or more corresponding previous time steps to generate an encoded temporal context vector at the current time step (T); and processing, at a fully connected layer, the encoded temporal context vector to learn the control commands.

* * * * *